United States Patent
Klevtsov

(10) Patent No.: US 6,409,088 B1
(45) Date of Patent: Jun. 25, 2002

(54) SCANNING DEVICE FOR CAPTURING IMAGES

(75) Inventor: Valery Alekseevich Klevtsov, Demakova (RU)

(73) Assignee: Nauchno-Tekhnicheskykkooperativ (Vector), Demakova (RU)

(*) Notice: Subject to any disclaimer, the term of this patent is extended or adjusted under 35 U.S.C. 154(b) by 0 days.

(21) Appl. No.: 09/486,190

(22) PCT Filed: Oct. 7, 1998

(86) PCT No.: PCT/GB98/02997

§ 371 (c)(1),
(2), (4) Date: Mar. 13, 2000

(87) PCT Pub. No.: WO99/18536

PCT Pub. Date: Apr. 15, 1999

(30) Foreign Application Priority Data

Oct. 7, 1997 (RU) .......................................... 97116442

(51) Int. Cl.$^7$ ................................................. G06K 7/10
(52) U.S. Cl. .................. 235/473; 235/454; 235/462.25; 235/462.42; 362/31; 362/26
(58) Field of Search ........................ 235/462.11, 462.25, 235/462.35, 462.41, 454, 483, 472.01, 473, 462.42; 362/31, 32, 26, 27, 235

(56) References Cited

U.S. PATENT DOCUMENTS

| | | | |
|---|---|---|---|
| 4,295,040 A | 10/1981 | Berthier | 235/458 |
| 4,650,316 A | * 3/1987 | Matsumoto | 355/55 |
| 5,053,612 A | 10/1991 | Pielemeier et al. | 235/462 |
| 5,295,196 A | 3/1994 | Raterman et al. | 382/7 |
| 5,349,172 A | 9/1994 | Roustaei | 235/472 |
| 5,354,977 A | 10/1994 | Roustaei | 235/472 |
| 5,635,708 A | * 6/1997 | Obata | 235/472 |
| 5,841,121 A | * 11/1998 | Koenck | 235/472 |
| 6,053,409 A | * 4/2000 | Brobst et al. | 235/462.36 |
| 6,081,630 A | * 6/2000 | Kaneko | 382/313 |

FOREIGN PATENT DOCUMENTS

| | | |
|---|---|---|
| EP | 0 703 543 A1 | 3/1996 |
| WO | WO 94/19764 | 9/1994 |
| WO | WO 94/19766 | 9/1994 |
| WO | WO 98/03932 | * 7/1997 |

* cited by examiner

Primary Examiner—Karl D. Frech
Assistant Examiner—Uyen-Chau N. Le
(74) Attorney, Agent, or Firm—Oliff & Berridge, PLC

(57) ABSTRACT

A high performance scanning device is adapted for capture of image information from various financial instruments, such as, banknotes, credit cards, identification cards, banknotes, etc. The device uses a reflective light guide arranged for guiding both of the transmission and the reception of scanning illumination. The light guide allows effective concentration of illumination power for a high-performance scanning operation.

8 Claims, 3 Drawing Sheets

SCANNING DEVICE FOR CAPTURING IMAGES

BACKGROUND OF THE INVENTION

The invention relates to scanning devices for capturing information, for example images from paper carriers, and is particularly concerned with scanning devices for capturing information on financial instruments such as banknotes of various types.

Various scanning devices for capturing information on paper image carriers are known. The most well known devices are hand-held scanners for reading bar codes, e.g. one patented under USSR Inventor's Certificate No. 1837334. That device contains a light source, a converging lens, an aperture diaphragm and diaphragm-coupled light receiver, all optically coaxial. A spherical lens is mounted between the scanned carrier and the aperture diaphragm. Such device may have the form of a ballpoint pen-like rod and be of a fairly simple design. The functionality of such a device, however, is limited to reading bar codes, its accuracy, resolution and operation speed being insufficient for other purposes. Other hand-held apparatuses—more sophisticated in design and having expanded functionalities—are also known (e.g. U.S. Pat. No. 5,349,172, U.S. Pat. No. 5,354,977, WO 94/19766 and WO 94/19764). Those devices use LED arrays to illuminate the carrier scanned and CCD arrays to take in reflected signals. Such devices, however, do not have sufficient functionality for scanning in large amounts of information when necessary.

Also known are desk-top scanning devices for capturing images and printed information. Such devices contain an optical unit comprising a light source, a light guide, a focusing and/or filtering optical element system, a light receiver and an A-D converter processing signals from the light receiver (e.g. Russian Federation Patent No. 2032217 and U.S. Pat. No. 5,295,196).

The deficiencies of known devices consist in their design complexity and the illuminator's excessive power consumption. The complexity of design is primarily the result of the sophisticated optical system which uses lenses, mirrors, etc. as focusing elements which are challenging in manufacture and require precise adjustment for correct operation of the device. Moreover, in order to obtain reflected luminous flux of sufficient intensity, a great amount of light energy is required to illuminate the information carrier.

SUMMARY OF THE INVENTION

The objective of this invention is the development of a scanning device, which is simple in design, provides high performance and high speed of operation at a low power of illumination to capture images on transported carriers, for example paper or plastics, and in particular security documents such as credit cards, identification cards and banknotes carried on a transport system, such as a banknote processing machine.

In accordance with the present invention, we provide a scanning device for capturing images, which contains an optical unit comprising a light source, a light guide, and a light receiver, wherein the light guide comprises a substantially parallel sided, transparent member, the member having opposite ends extending between the parallel sides, one of the ends facing the light source and extending non-orthogonally between the parallel sides, the other end facing the image to be scanned in use, whereby light from the light source enters the light guide through the one end, is directed onto the image after passing out of the other end, is reflected back into the light guide and then directed by the light guide towards the light receiver.

The use of a light guide of this form concentrates light from the light source on to the carrier, thus enabling relatively weak sources to be used while at the same time providing a simple way of separating the transmitted and received light (and corresponding transmitting and receiving apparatuses) in a compact manner.

BRIEF DESCRIPTION OF THE DRAWINGS

An example of a scanning device according to this invention will now be described with reference to the accompanying drawings, in which.

DETAILED DESCRIPTION OF THE INVENTION

Figure 1:
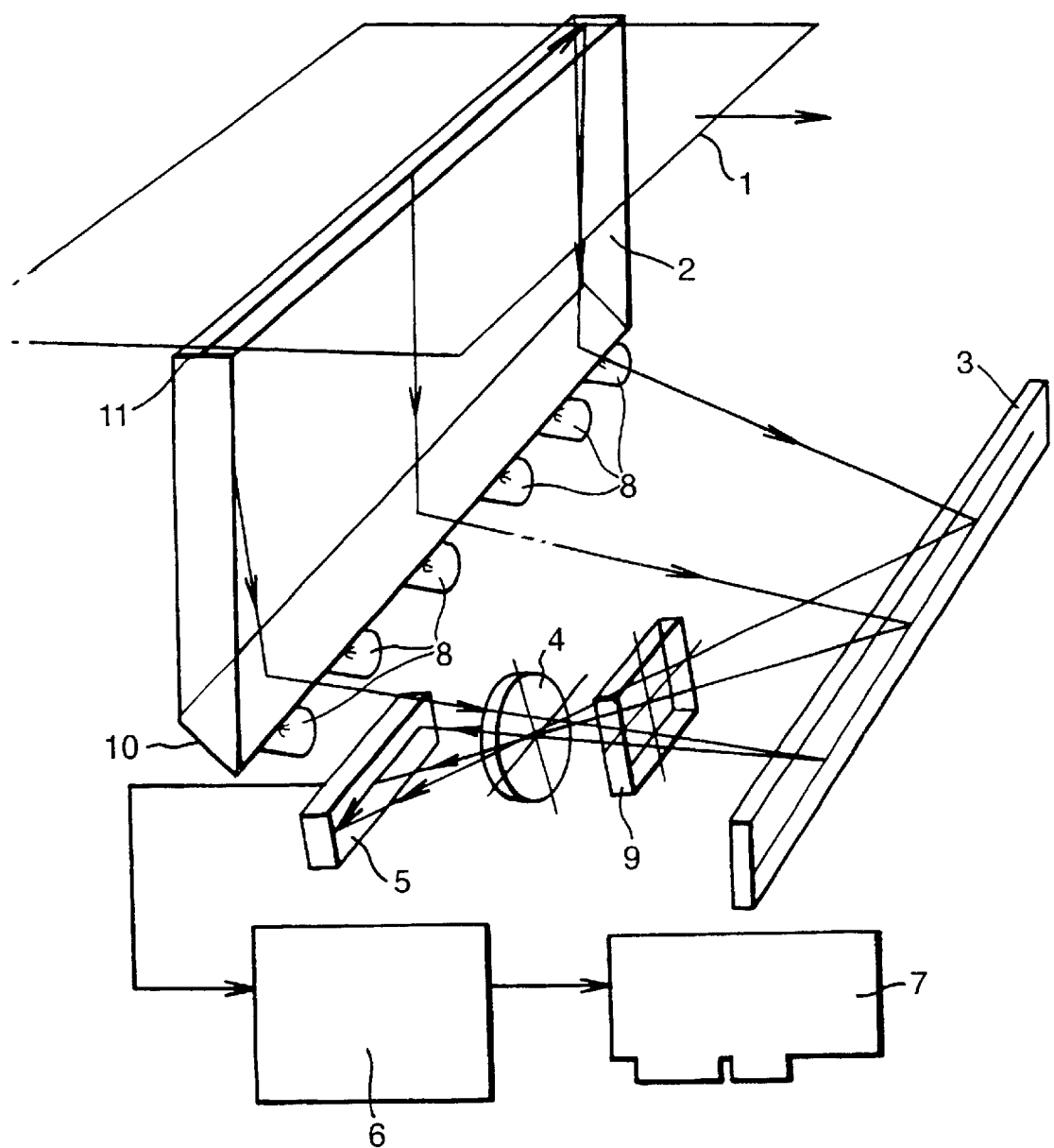
FIG. 1 is a diagram of the scanning device for capturing images, partly in block diagram form.

The scanning device for capturing an image from a carrier 1 (see FIG. 1) comprises a light source, a light guide 2, a rotatable mirror 3, a lens 4, and a CCD or other photosensitive linear array 5 which serves as an image receiver in this particular sample, a CCD array control unit 6 and an A-D converter 7 of signals arriving from CCD linear array 5. Typically, the image may be information or patterns including all overt and covert elements of financial instruments such as banknotes, cheques, travellers cheques and postal orders.

The light source in this example comprises six tungsten filament bulbs 8, preferably halogen-filled, 15W each. Of course, any other type of light source could be used as well as different numbers from six. The light may be visible or non-visible, for example infra-red, or a combination. The bulbs are arranged in a row and are located in front of and practically in contact with a lower canted edge 10 of the light guide 2. Light guide 2 is a transparent plane-parallel plate, made of glass in this example, one of the end sides whereof—bottom side 10 in this example—is canted at 45° to the parallel sides. The cant angle may vary depending on a number of factors. These will be described in more detail below but include the detection system, the illumination system and the refractive index of the glass. As far as the detection system is concerned, the angle of the prism determines where the mirror 3, lens 4 and sensor 5 are to be placed, the refractive index of the glass having a small part to play in this as well. The cant angle and refractive index of the glass determine the characteristics of the illumination system (intensity, uniformity, etc.).

End side 11 opposite to the canted edge 10 of the light guide faces the carrier 1 and extends orthogonally to the parallel sides although other non-orthogonal angles could be used. FIG. 1 shows the version of the device where rotatable mirror 3 is installed to achieve compactness. The mirror 3 is rotatable to adjust deflection of the beam on to the lens 4 and the sensor 5. An optional light filter 9 is installed between lens 4 and mirror 3. The use of the mirror 3 is also optional. The filter 9 is only needed if certain wavelengths are to be sensed, for example as a result of fluorescence or irradiation in the infrared.

The cant angle will be chosen to optimise performance in light concentration and separation but conveniently the angle is in the range 27°–49°, preferably 41°–49°.

CCD linear array 5, CCD array control unit 6 and A-D converter 7 of CCD array signals are electrically linked and operate in a conventional manner to provide a digital output of the line image received on the array 5.

Figure 2:
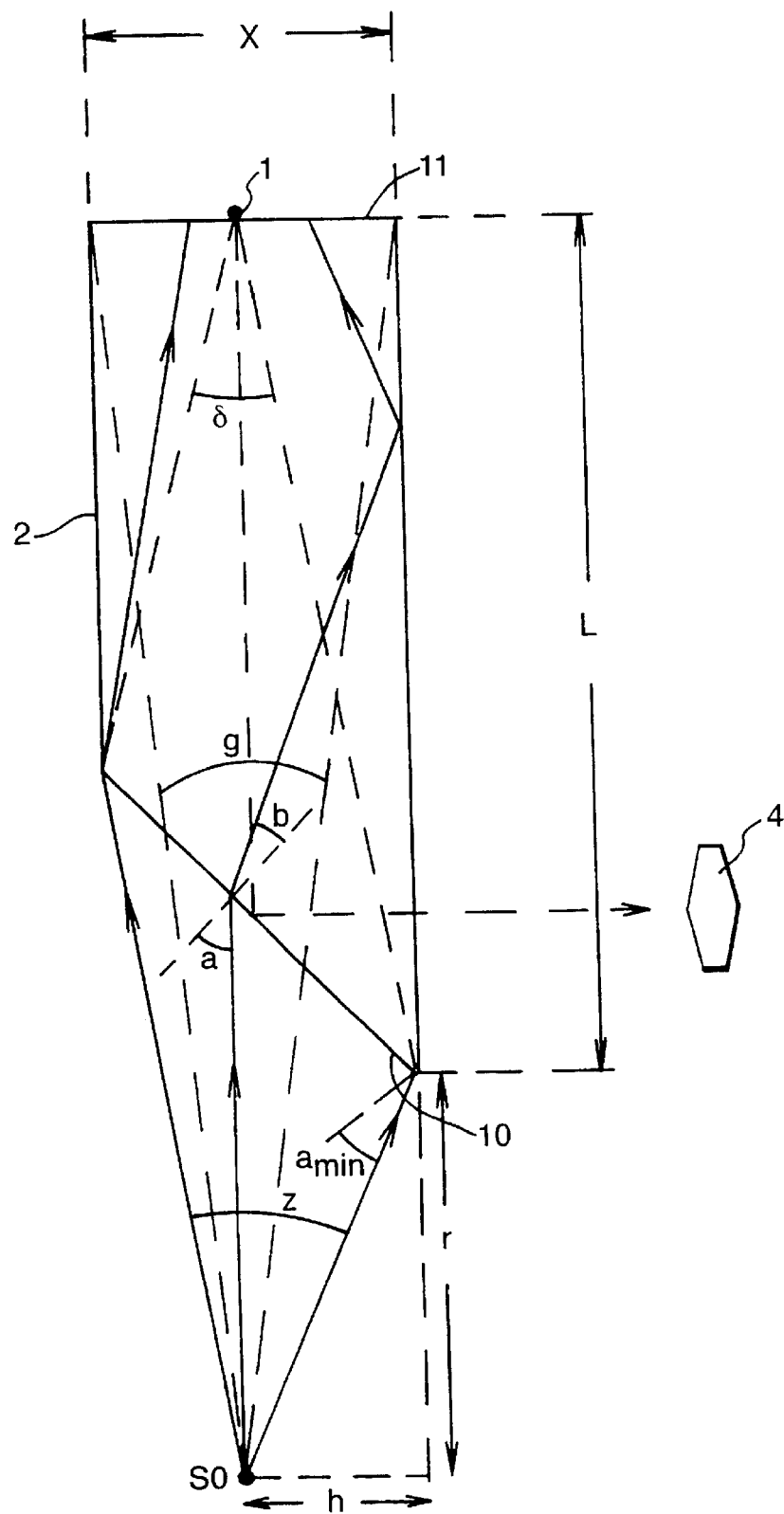
FIG. 2 is a ray diagram illustrating light flux through the light guide.

FIG. 2 shows how light travels through light guide 2. This Figure has the following designations:

SO: the location of light sources 8;
X: thickness of light guide 2;
L: length of light guide 2;
Z: angle of light capture by light guide 2;
g: angle of light capture, had there been no light guide 2;
a: angle of incident light to the normal at the canted side 10;
b: angle of refracted light to the normal at the canted side 10;
r;h distance of source SO from canted side 10 in directions shown.
δ: dispersion angle of rays falling onto the canted light-guide end from the points located at the upper butt end of the light-guide.

In this case, r=4.61 mm and h=1.525 mm.

The device functions as follows:

Light sources 8 emit light which partially enters light guide 2 through its canted side 10 (FIG. 1) to travel through and then fall through its end side 11 onto the surface of the carrier 1 e.g. a banknote (indicated schematically in FIG. 2) which is being transported across and clear of end side 11, which clearance measures 0.5–2 mm in this example. In other cases, the banknote may be transported along the end side 11 or across it at a non-orthogonal angle. Such clearance provides maximum illumination of carrier 1, subject to the dispersion of light issuing from light guide 2 which depends on the actual thickness of the guide. The clearance guarantees prevention of damage and wear on the surface of side 11 in the course of operation of the device. Light reflected by carrier 1 re-enters light guide 2 through the end side 11 and issues through its canted side 10 almost perpendicular to the side surface of the plate (as seen in FIG. 1) for conveyance to the lens 4. (In FIG. 2, the optical components between the light guide 2 and the lens 4 have been omitted.)

A mathematical analysis of the system is set out below:

In this example, the butt-end 11 of the light-guide 2 is brought into close proximity with the object to be scanned and the butt-end 10 of the light-guide 2 has a 45° canted edge. In general, the canted edge angle may vary in the range from $(90-\beta 0)/2+\delta$ to $90-\beta 0-\delta$ where $\beta 0$ is the critical angle for full internal reflection.

For different types of glass the $\beta 0$ angle is somewhere in the range from 40° (light crown glass) to 34° (dense flint glass). We have made use of light crown glass (40°) because it has the smallest absorption coefficient. In such case, the cant angle may vary from 25°+δ to 50°−δ. By using a lens 4 with a focal distance of 8.5 mm and an f number of 1.5 and with a distance from the lens of about 120 mm, the δ angle will approximately be: 8.5/1.5/120/n radians which is equal to 2° where n is the glass refractive index (which is 1.55).

The optimum cant angle will be between 27 and 49° We have selected 45° because it is very close to the optimum and is convenient to implement.

The rays come out of the butt end 11, the angle of incidence of which is less than the critical angle of full internal reflection (40° for the type of glass used light crown glass), while the angle of refraction "b" must be more than 5° By the laws of refraction sin(a)/sin(b)=n and so, "a", the angle of incidence on the canted end 10, must exceed amin=8°. With the above provision observed, all rays falling onto the canted end 10 of the light-guide will come out from the end 11 after being practically 100% reflected from the side edges (walls) of the light-guide, i.e. the light will not be able to escape through the side walls.

The minimum angle of incidence in the given design will be on the canted end 10 of the light-guide 2. With the bulb glass radius V=4 mm (of the sources 8) the SO point will be located at a distance of h=r*tan(45−a min)=2.7 mm. With the light-guide thickness of 3 mm, angle of capture "z" will be z=(45−a min)+arctan((X−h)/(X+r))=approximately 39°. With the light-guide length L of 72 mm, the "g" angle= 2*arctan((X/2)/l+r))=2.2°.

The light-guide efficiency is:

$$K=K_{ri}*K_{ro}*Z/g$$

$K_{ri}$, $K_{ro}$ are transmissivities at the light-guide entrance and exit surfaces 10, 11 respectively.

If one views the dependence of K on the light-guide thickness with its length being constant, then one can see that the light-guide efficiency increases with a decrease of the light-guide thickness, i.e. the thinner the better. On the other hand, the minimum light-guide thickness is determined by angle δ, which has been calculated previously in such a way that the lens lightpower should be maximized.

For δ=2°, $X\min=\delta*\pi/180*1=2.5$ mm.

Making use of such thickness light-guide requires high precision positioning of all components of the optical system, that is why we have selected X=3 mm.

In our case $K=K_{ri}*K_{ro}*39/2.2=17.7*K_{ri}*K_{ro}$

At the light-guide entrance the mean angle of incidence is 45°. At this angle, about 93% of light energy enters the glass. The mean angle of incidence at the exit is 30°. At this angle, about 93% energy is transmitted.

Then $K=0.93*0.93*17.7=15$

Figure 3:
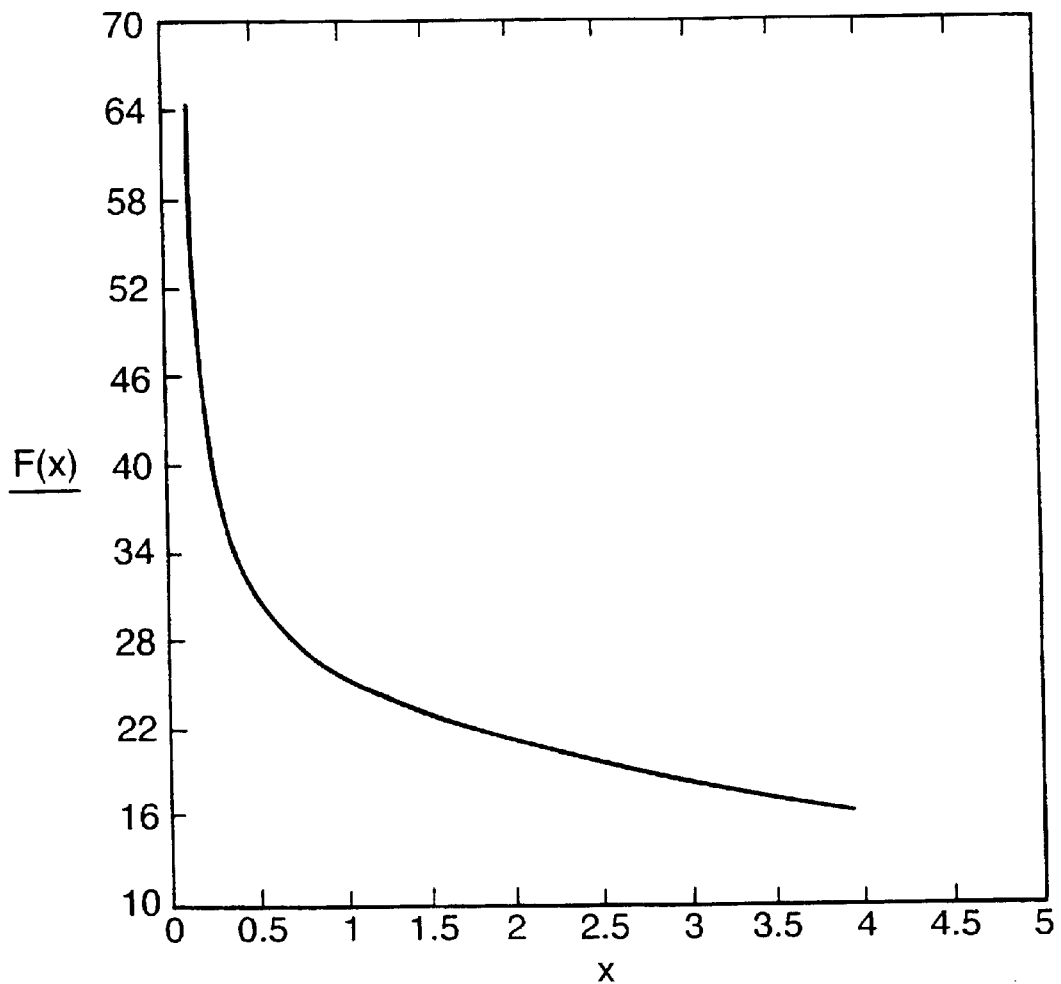
FIG. 3 is a graph of the light-guide efficiency dependence on light-guide thickness (with a bulb radius of 8 mm and a light-guide length of 80 mm) without taking into consideration the influence of transmissivities of the rays at the entrance and exit edges.

FIG. 3 illustrates the light guide efficiency as a function of X.

The use of a flat surface light-guide allows a comparatively cheap solution of several technological problems: focusing and directing light to the scanning zone, transmitting light to the photo-receiving element. Also, the use of the flat surface light-guide allows the problem of dust protection of the optical unit to be solved simply.

Theoretical estimation shows that the light guide 2 increases the intensity of illumination of the scanned area approximately 15 times as compared with direct illumination. Actual measurements have shown approximately an 8–9 fold increase in the intensity of illumination. The variance between the theoretical estimate and actual measurements is accounted for by the finite dimensions of the light source and inaccurate alignment.

The rays reflected from the carrier 1 after coming out of light guide 2 are reflected from mirror 3 and then through light filter 9 and lens 4 on to the CCD array 5. The CCD array 5 generates an electric signal which is proportional to the amount of light falling onto it and therefore proportional to the reflectivity of information carrier 1 surface fragments.

By way of using the line scan CCD array 5 as a photo-sensitive element, a very high rate of information reading by scanning (capturing) can be achieved. The analogue signal from line scan CCD array 5 is then converted by converter 7 into a digital signal and then it can be fed for further processing to a computing device such as PC or it can be fed into a readout display (not shown).

The invention is compact, consumes very little power and is capable of high speed operation when reading even half-tone images (pictures). Due to its design simplicity, after minor modification the device can be very easily incorporated into any sheet processing machine such as a banknote sorting, dispensing or counting machine, in order to detect characteristics (such as denomination, authenticity etc.) of the banknotes.

What is claimed is:

1. A scanning device for capturing images, which contains an optical unit comprising a light source, a light guide, and a light receiver, wherein the light guide comprises a substantially parallel sided, transparent member, the transparent member having opposite ends extending between the parallel sides, one of the ends facing the light source and extending non-orthogonally between the parallel sides, other end facing the image to be scanned in use whereby light from the light source enters the light guide through the one end, is directed onto the image after passing out of the other end, is reflected back into the light guide and then directed by the light guide towards the light receiver.

2. A device according to claim 1, wherein the one end extends at an angle in the range 41°–49° to the parallel sides.

3. A device according to claim 1, wherein the one end extends at an angle in the range $(90-\beta 0)/2+\delta$ to $90-\beta 0-\delta$, where $\beta 0$ is the maximum angle of full internal reflection and $\delta$ is the dispersion angle of rays falling on the one end from the other end.

4. A device according to claim 1, wherein the one end extends at an angle in the range 27°–49° to the parallel sides.

5. A device according to claims 1, wherein the light guide is made of optical-grade glass.

6. A device according to claims 1, wherein the light receiver is a linear CCD array.

7. A device according to claims 1, further comprising a lens for focusing light from the light guide onto the light receiver.

8. A device according to claims 1, further comprising an A-D converter for converting analogue signals from the light receiver to digital signals.

* * * * *